United States Patent [19]

Jensen

[11] Patent Number: 5,318,134

[45] Date of Patent: Jun. 7, 1994

[54] IRRIGATION FURROW AND RAISED SEED BED FORMING MACHINE

[76] Inventor: Philip Jensen, 402 7th St., Fowler, Colo. 81039

[21] Appl. No.: 947,297

[22] Filed: Sep. 17, 1992

[51] Int. Cl.$^5$ .............................................. A01B 39/19
[52] U.S. Cl. ................................... 172/44; 172/47; 172/157; 172/182; 172/195
[58] Field of Search ................... 172/63, 67, 68, 70, 172/44, 155, 156, 157, 171, 174, 182, 195, 245, 250, 254, 439, 47, 776; 280/414.1, 407

[56] References Cited

U.S. PATENT DOCUMENTS

| | | | |
|---|---|---|---|
| 2,227,650 | 1/1941 | Imus | 172/68 |
| 2,652,760 | 9/1953 | Card | 172/70 |
| 3,140,678 | 7/1964 | Morris | 111/67 |
| 3,312,288 | 4/1967 | Cervenka | 172/44 |
| 3,316,865 | 5/1967 | Williams | 111/6 |
| 3,402,774 | 9/1968 | Robinson | 172/413 |
| 3,437,061 | 4/1969 | Wells | 111/1 |
| 3,538,987 | 11/1970 | Taylor | 172/60 |
| 3,576,213 | 4/1971 | Hall | 172/44 |
| 4,397,358 | 8/1983 | Handy | 172/44 |
| 4,537,261 | 8/1985 | Hatzell | 172/44 |
| 5,029,650 | 7/1991 | Smit | 172/439 X |

Primary Examiner—Clifford D. Crowder
Assistant Examiner—Paul C. Lewis
Attorney, Agent, or Firm—John R. Flanagan

[57] ABSTRACT

An irrigation furrow and raised seed bed forming machine includes a main support frame, a hitch assembly, furrow and seed bed forming shovel assemblies, a seed bed mulching assembly, seed bed conditioning roller assemblies, and furrow side finishing slide assemblies. These assemblies of the furrow and bed forming machine are operable and cooperate to form irrigation furrows and raised seed beds in soil as the machine, being mounted to a tractor, is moved through a field. The hitch assembly is adapted for mounting the main support frame to the tractor to extend transversely to the direction of movement of the machine. The shovel assemblies are mounted to a forward portion of the main support frame in laterally spaced relation to one another. The mulching assembly is mounted at a middle portion of the main support frame rearwardly of the shovel assemblies and has an elongated rotatable mulching member extending transversely to the direction of movement of the machine through the field. The conditioning roller assemblies are mounted to a rearward portion of the main support frame in laterally spaced relation to one another and rearwardly of the mulching member. The finishing slide assemblies are mounted to the main support frame in laterally spaced relation to one another and extend rearwardly from and aligned with the shovel assemblies between the conditioning roller assemblies and along the direction of movement of the machine.

24 Claims, 5 Drawing Sheets

IRRIGATION FURROW AND RAISED SEED BED FORMING MACHINE

BACKGROUND OF THE INVENTION

1. Field of the Invention

The present invention generally relates to agricultural machines and, more particularly, is concerned with an irrigation furrow and raised seed bed forming machine.

2. Description of the Prior Art

In farming in fields where crops must be irrigated, it is common practice to make furrows in the field before planting. Not only well-formed irrigation furrows but also the preparation of smooth and level raised seed beds between the furrows is desired. The process of forming the irrigation furrows and raised seed beds is referred to as "bedding". During irrigation, water seeps and soaks into the beds from the furrows.

Bedding the field before planting is necessary for a variety of reasons and usually depends on the type of crop to be grown. For example, in vegetable production it is common practice to bed the ground before planting. This allows the farmer to do a more accurate job of planting by concentrating only on the operation of the planter since the forming of the soil into beds has already been accomplished. Another reason for bedding the field before planting is to allow the farmer to irrigate the field before the crop is planted. This is necessary to supply needed moisture to later germinate the crop seeds and to sprout weed seeds that might be located in the seed bed area. After they have sprouted, the weeds can be destroyed by cultivation before or during planting of the crop.

In bedding the field, the farmer desires to produce irrigation furrows and raised beds of high quality. This means that the furrows and beds must be of proper size and shape. Also, the beds must be free from large clods, substantially level and lightly packed so that the water in the furrows will soak across the bed area. In order to achieve the desired quality of field bedding, a machine suitably versatile and adjustable to accommodate varying conditions must be provided.

Irrigation furrows and raised seed beds typically have been prepared by specialized machines which are only used in bedding the fields before planting. Different machines have been proposed in the prior patent art for forming irrigation furrows and shaping and leveling raised seed beds. Some machines representative of the patented prior art are those disclosed in U.S. Pat. Nos. to Williams (3,316,865), Wells (3,437,061) and Taylor (3,538,987).

While these particular machines probably operate satisfactorily under the limited range of conditions for which they were designed, none of these machines appear to be sufficiently versatile and adjustable to be capable of providing raised seed beds and irrigation furrows of the quality desired. Consequently, a need still exists for improvements in the design of an irrigation furrow and raised seed bed forming machine for use in bedding fields.

SUMMARY OF THE INVENTION

The present invention provides an irrigation furrow and raised seed bed forming machine designed to satisfy the aforementioned need. The irrigation furrow and raised seed bed forming machine of the present invention incorporates different features which makes it suitably versatile and adjustable to meet all of the anticipated variable conditions typically encountered in bedding fields.

One feature of the furrow and bed forming machine of the present invention is a hitch assembly being mounted to a main transverse support frame of the machine. The hitch assembly is relocatable between two different orientations on the main support frame for adapting the furrow and bed forming machine to be connected to a tractor in two different modes so that the machine can be moved through the field by the tractor in a vertically fixed position or in a vertically adjustable position relative to the field.

Another feature of the furrow and bed forming machine of the present invention is a plurality of furrow and seed bed forming shovel assemblies being mounted to a forward portion of the main support frame in spaced relation to one another transversely to the direction of movement of the machine through the field. The shovel assemblies are vertically adjustable relative to the main support frame for presetting shovels of the assemblies at any one of a plurality of different desired depths in the ground to form irrigation furrows having corresponding depths as the machine is moved through the field.

A further feature of the furrow and bed forming machine of the present invention is a seed bed mulching assembly being mounted at a middle portion of the main support frame rearwardly of the furrow and seed bed forming shovel assemblies and having an elongated rotatable mulching member extending transversely to the direction of movement of the machine through the field. The .mulching member, provided either in a vertically floating position or in a vertically adjustable preset position relative to the field, is operable to mulch the soil and crush soil clods such that seed beds formed between the furrows are tilled and levelled to a desired extent as the machine is moved through the field.

Yet another feature of the furrow and bed forming machine of the present invention is a plurality of seed bed conditioning roller assemblies being rotatably mounted to a rearward portion of the main support frame rearwardly of the seed bed mulching assembly and in spaced relation to one another transversely to the direction of movement of the machine through the field. Each of the conditioning roller assemblies includes a conditioning roller being mounted to floatably and rotatably ride on the seed bed and being operable to smooth and pack the surface of the seed bed to a desired degree as the machine is moved through the field.

Still another feature of the furrow and bed forming machine of the present invention is a plurality of furrow side finishing slide assemblies being mounted to the main support frame in spaced relation to one another transversely to the direction of movement of the machine through the field. Also, the slide assemblies extend along the direction of movement of the machine through the field rearwardly from the respective furrow and seed bed forming shovel assemblies, between the seed bed conditioning roller assemblies, and intersecting with the seed bed mulching member. The slide assemblies are operable to smooth and pack the surfaces of the sides of the furrows as the machine is moved through the field.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In General

Figure 1:
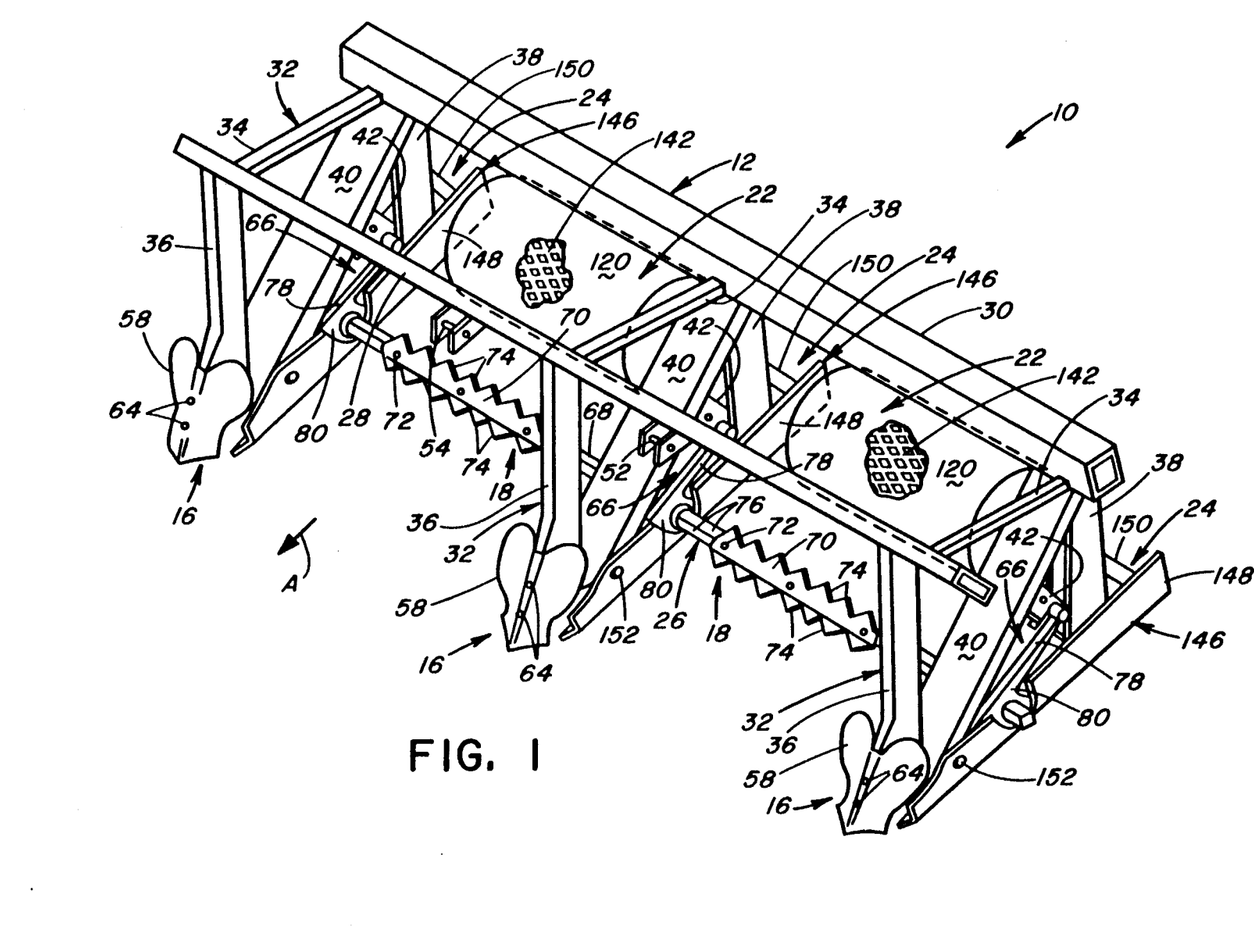
FIG. 1 is a perspective view of an irrigation furrow and raised seed bed forming machine of the present invention. The machine has been shortened in width and the hitch assembly and drive mechanism of the machine have omitted for the purpose of brevity and clarity. As an example, the machine would typically be constructed to have a length for forming seven furrows and six seed beds.
Figure 2:
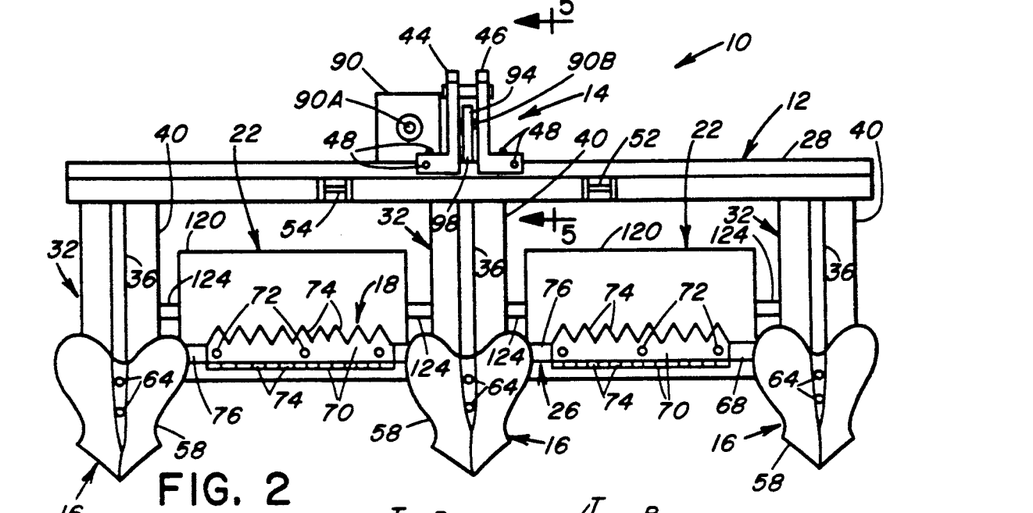
FIG. 2 is a front elevational view of the machine of FIG. 1 with the hitch assembly and drive mechanism present.
Figure 3:
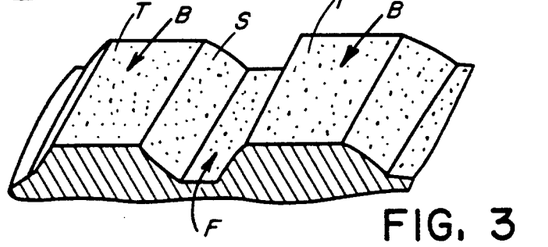
FIG. 3 is a perspective view of a section of field soil that has been formed into irrigation furrows and raised seed beds by the machine of FIG. 1.
Figure 4:
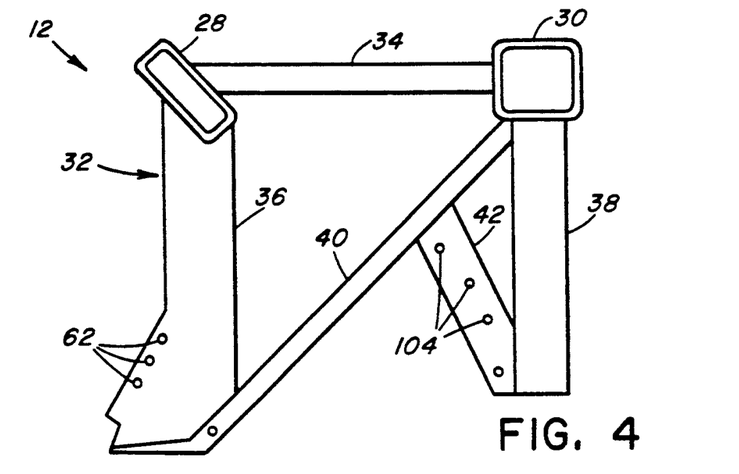
FIG. 4 is an enlarged fragmentary side elevational view of the machine of FIG. 1, illustrating one of the laterally-spaced frame sections of a main transverse support frame of the machine.

Referring to the drawings, and particularly to FIGS. 1 and 2, there is illustrated an irrigation furrow and raised seed bed forming machine of the present invention, being generally designated 10. Basically, the furrow and bed machine 10 includes a main support frame 12, a hitch assembly 14, a plurality of furrow and seed bed forming shovel assemblies 16, a seed bed mulching assembly 18, a drive mechanism 20 for the mulching assembly 18, a plurality of seed bed conditioning roller assemblies 22, and a plurality of furrow side finishing slide assemblies 24. The machine 10 is operable to form irrigation furrows F and raised seed beds B into the field soil, as depicted in FIG. 3, as the machine 10, mounted to a tractor (not shown) is moved through the field.

The hitch assembly 14 of the machine 10 is adapted for mounting the main support frame 12 to a three-point hitch quick-release mechanism (not shown) of the tractor to extend transversely to the direction of movement of the machine 10 (as represented by arrow A) through the field. The shovel assemblies 16 are mounted to a forward portion of the main support frame 12 in spaced relation to one another transversely to the direction A of movement of the machine 10 through the field. The shovel assemblies 16 are operable to form the furrows F and the raised seed beds B in the field as the machine 10 is moved through the field by the tractor.

The seed bed mulching assembly 18 of the machine 10 includes an elongated mulching member 26 rotatably mounted between front and rear portions and along a middle portion of the main support frame 12 rearwardly of the furrow and seed bed forming shovel assemblies 16. The mulching member 26 extends transversely to the direction A of movement of the machine 10 and generally parallel to the field and in contact with the soil in the field. The drive mechanism 20 is mounted to the main support frame 12 above the mulching assembly 18 in a position to be drivingly coupled to the mulching member 26 of the mulching assembly 18 for transmitting rotary motion thereto such that the mulching member 26 is operated to mulch the soil in the seed beds B between the furrows F to the desired extent.

The seed bed conditioning roller assemblies 22 of the machine 10 are rotatably mounted to a rearward portion of the main support frame 12 in laterally spaced relation to one another and rearwardly of the seed bed mulching assembly 18. The seed bed conditioning roller assemblies 22 extend transversely to the direction A of movement of the machine 10 and are operable to smooth and pack the top surface T of the seed bed B to a desired degree as the machine 10 is moved through the field.

The furrow side finishing slide assemblies 24 of the machine 10 are mounted to the main support frame 12 in spaced relation to one another transversely to the direction of movement of the machine 10 through the field. The slide assemblies 24 extend along the direction A of movement of the machine 10 rearwardly of the furrow and seed bed forming shovel assemblies 16, between the seed bed conditioning roller assemblies 22, and intersecting with the mulching member 26. The slide assemblies 24 are operable to smooth and pack surfaces of sides S of the furrows F formed by the shovel assemblies 16 as the machine 10 is moved through the field.

Main Support Frame and Hitch Assembly

Referring to FIGS. 1, 2, 4 and 5, the main support frame 12 of the machine 10 includes a pair of fore-and-aft spaced front and rear beam members 28, 30 and a plurality of fore-and-aft frame sections 32 mounted to the front and rear beam members 28, 30. The front and rear beam members 28, 30 extend transversely to the direction A of movement of the machine 10 through the field. The rear beam member 30 has a hollow square cross-sectional shape, whereas the front beam member 28 has a hollow rectangular cross-sectional shape. The front beam member 28 is disposed and fixed at a forwardly inclined angle to the vertical to minimize the degree of obstruction of the line of vision of the operator from the tractor seat to the mulching assembly 18 of the machine 10.

The frame sections 32 are laterally spaced from one another transversely to the direction of movement of the machine 10 through the field. Further, the frame sections 32 extend below the front and rear beam members 28, 30 and along the direction A of movement of the machine 10 through the field. Each frame sections 32 includes an upper horizontal member 34, a pair of generally vertical front and rear members 36, 38, and a first brace member 40 interconnecting and extending diagonally between the upper end of the rear member 38 and the lower end of the front member 36. A second brace member 42, being shorter in length than the first brace member 40, interconnects and extends diagonally between the lower end of the rear member 38 and the first brace member 40.

Figure 5:
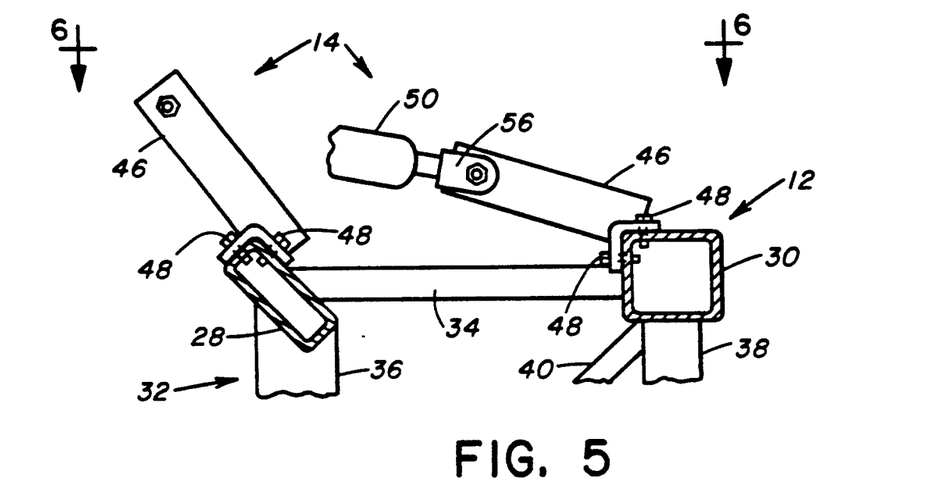
FIG. 5 is an enlarged fragmentary longitudinal sectional view of the machine as seen along line 5—5 of FIG. 2, illustrating the hitch assembly of the machine in its two different orientations on the main support frame but with the drive mechanism omitted.

The hitch assembly 14 is mounted to a main support frame 12 of the furrow and bed forming machine 10 so as to be relocatable between two different orientations on the main support frame 12 for adapting the furrow and bed forming machine 10 to be connected to a tractor in two different ways. In a first of the two ways in which the hitch assembly 14 is mounted upon the front transverse beam member 28, the furrow and bed forming machine 10 can be moved through the field by the tractor with the main frame 12 maintained only in a fixed vertical position relative to the field. In a second of the two ways in which the hitch assembly 14 is mounted upon the rear transverse beam member 30, the furrow and bed forming machine 10 can be moved through the field by the tractor with the position of the main frame 12 being vertically adjustable relative to the field.

Figure 6:
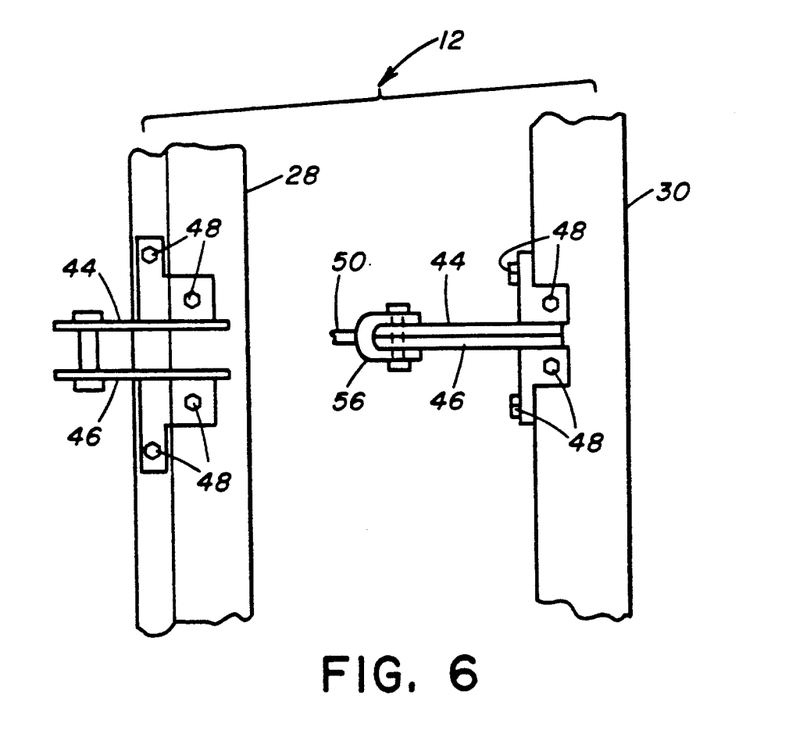
FIG. 6 is a top plan view of the hitch assembly of the machine taken along line 6—6 of FIG. 5.

More particularly, the hitch assembly 14 includes a pair of brackets 44, 46 mountable upon the main frame 12 in two different side-by-side orientations which dictate in which one of the two different ways the furrow and bed forming machine 10 will be connected to the tractor. When the brackets 44, 46 are disposed in a first side-by-side spaced apart orientation with respect to one another, they are mounted by suitable fasteners 48 upon the front transverse beam member 28 of the main frame 12 so as to project forwardly from the main frame 12. In such first orientation, then the brackets 44, 46 are suitably positioned for direct connection to an upper middle coupling portion of the quick release mechanism on the tractor three point hitch (not shown).

When the brackets 44, 46 are disposed in a second side-by-side non-spaced apart orientation with respect to one another, they are mounted by the fasteners 48 upon the rear transverse beam member 30 of the main frame 12 so as to project forwardly from the rear beam member 30 to above the main frame 12. In such second orientation, then the brackets 44, 46 are suitably positioned for indirect connection to the upper middle coupling portion of the quick release mechanism on the tractor three point hitch (not shown) by a hydraulic actuator 50 extending from the brackets 44, 46 to the quick release mechanism. A pair of laterally spaced coupler members 52, 54 are fixed to and project forwardly from the front transverse beam member 28 of the main frame 12 for connection to a pair of corresponding laterally spaced lower coupling portions of the quick release mechanism on the tractor three point hitch (not shown).

In their first orientation, the brackets 44, 46 are laterally spaced apart to provide sufficient space between them in which to receive the upper middle coupling portion of the quick release mechanism. There is insufficient space for employment of the hydraulic actuator 50 and so the furrow and bed forming machine 10 can only be drawn through the field by the tractor with the position of the main frame 12 being fixed vertically relative to the field. In their second orientation, the brackets 44, 46 are disposed flush with one another so that a clevis 56 on the hydraulic actuator 50 can be pivotally coupled over both brackets 44, 46. Also, there is sufficient space for employment of the hydraulic actuator 50 and so the furrow and bed forming machine 10 can be drawn through the field by the tractor with the position of the main frame 12 being vertically adjustable and variable relative to the field.

Furrow and Seed Bed Forming Shovel Assemblies

Figure 7:
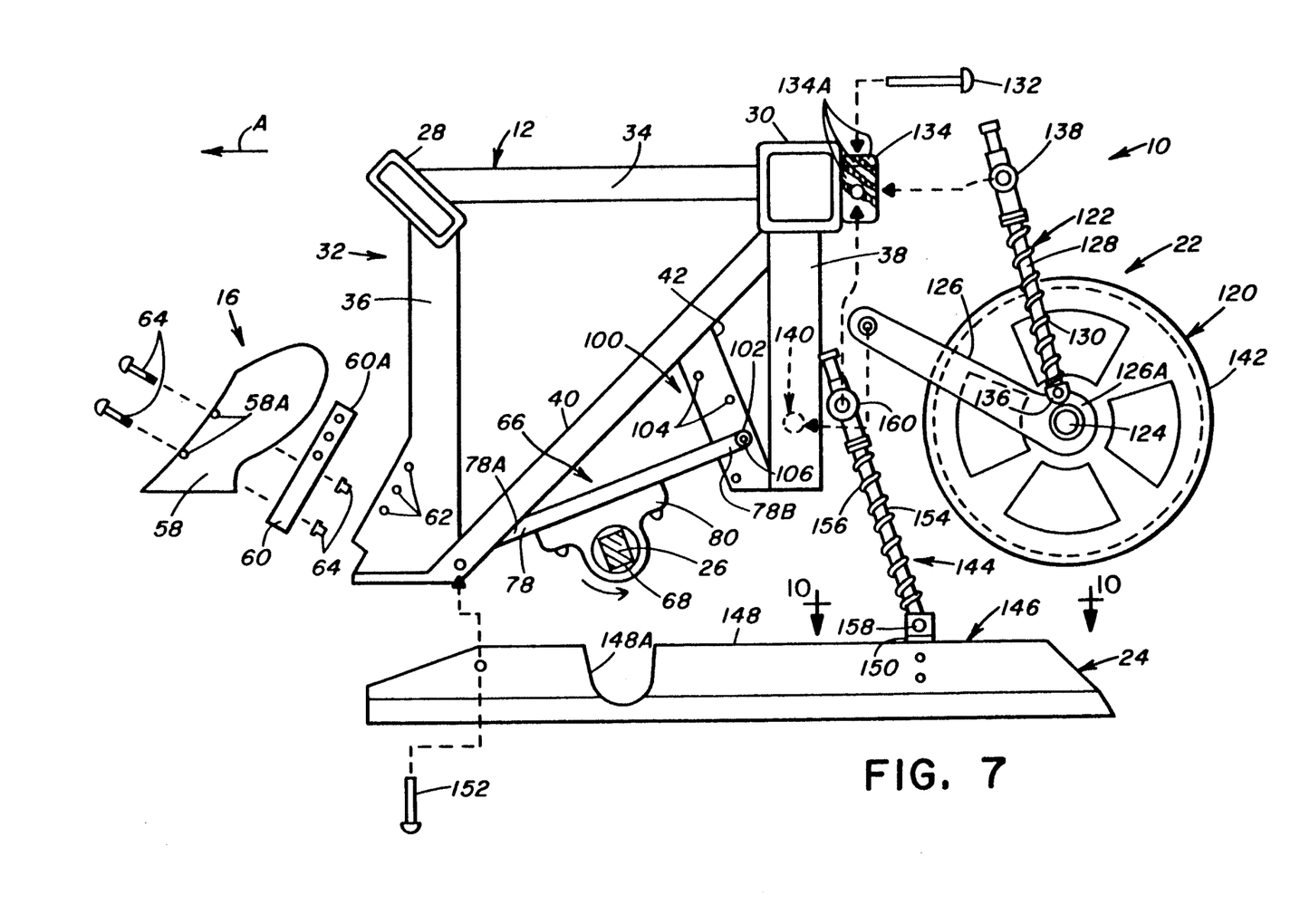
FIG. 7 is an enlarged side elevational exploded view of the machine of FIG. 2, with the hitch assembly and drive mechanism omitted, illustrating one of a plurality of furrow and seed bed forming shovel assemblies, a seed bed mulching assembly, one of a plurality of seed bed conditioning roller assemblies, and one of a plurality of furrow side finishing slide assemblies of the machine of FIG. 1.

Referring to FIGS. 1, 2 and 7, there is shown the furrow and seed bed forming shovel assemblies 16 of the machine 10 mounted to respective front vertical members 36 of laterally spaced frame sections 32 of the main support frame 12. The shovel assemblies 16 are thus spaced apart transversely to the direction A of movement of the machine 10 through the field and operable to form the furrows F and raised seed beds B in the field as the machine 10 is moved through the field.

More particularly, each shovel assembly 16 includes a shovel 58 contoured for lifting or plowing and turning or pushing the soil to both sides and thereby forming a furrow F. Also, each shovel assembly 16 includes a bracket 60 for mounting the shovel 58 to the front vertical member 36 of the main support frame 12. Each shovel assembly 16 further includes means in the form of holes 58A, 60A, 62, in the shovel 58, bracket 60, and front vertical member 36 and a plurality of fasteners 64 for removably attaching the bracket 60 and the shovel 58 therewith at any selected one of a plurality of generally vertically spaced locations on the front vertical member 36 of the one frame section 32. In such manner, the bracket 60 and shovel 58 are vertically adjustable relative to the front vertical member 36 of the frame section 32 for presetting the shovel 58 at any one of a plurality of different desired depths in the ground to form the irrigation furrows F having corresponding depths as the machine 10 is moved through the field.

Mulching Assembly and Drive Mechanism

Referring to FIGS. 1, 2 and 7-9, there is shown the seed bed mulching assembly 18 of the machine 10 being operable to mulch the soil so as to till the seed beds B formed between the furrows F by the shovel assemblies 16 as the machine 10 is moved through the field. In addition to the elongated mulching member 26, the mulching assembly 18 includes mounting means 66 for rotatably mounting the mulching member 26 rearwardly of the shovel assemblies 16 to each of the frame sections 32 of the main support frame 12 such that the mulching member 26 extends transversely to the direction A of movement of the machine 10 through the field and across and in engagement with the soil of the raised beds B formed by the shovel assemblies 16.

Figure 8:
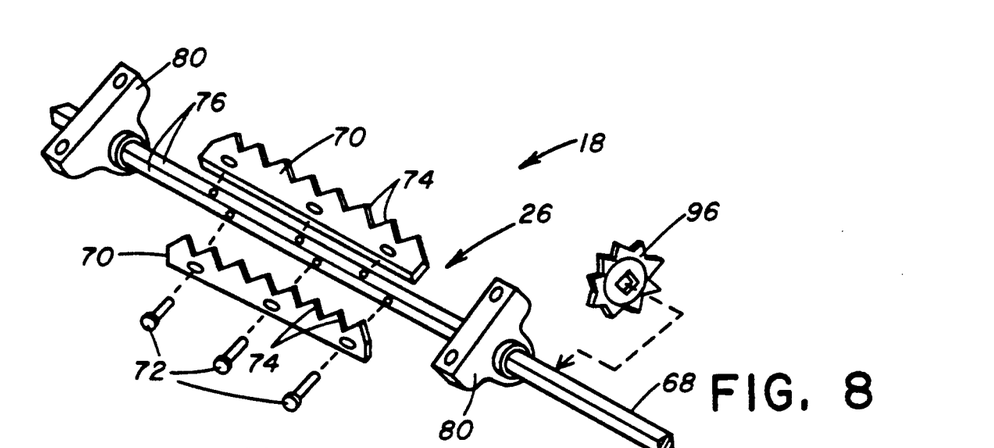
FIG. 8 is a fragmentary perspective exploded view of an elongated mulching member of the seed bed mulching assembly of the machine of FIG. 1 removed from the machine.

Referring to FIGS. 1, 2 and 8, the mulching member 26 includes an elongated bar 68 and a plurality of teeth-bearing elements 70 attached along the bar 68 by fasteners 72 so as to extend between the frame sections 32. Preferably, the bar 68 is square in cross-section and the rows of teeth 74 on the elements 70 project beyond the adjacent longitudinal surfaces 76 of the bar into engagement with the soil of the raised beds B. The mulching member 26 is rotated, counterclockwise as shown in FIG. 7, such that the teeth-bearing elements 68 will force the soil to pass under the mulching bar 68. The soil is thrown into mounds on both sides of the furrows by the shovel assemblies 16 and thus the beds are generally very uneven and full of large clods which the shovels 58 have dug up. As the machine 10 moves in the forward direction A through the field, the teeth-bearing elements 68 are effective to mulch the soil and crush soil clods so that the soil of the seed beds B formed between the furrows F is tilled and levelled to the desired extent. If less aggressive action on the soil is desired, then the mulching member 26 can be employed with the teeth-bearing elements 68 removed.

Figure 9:
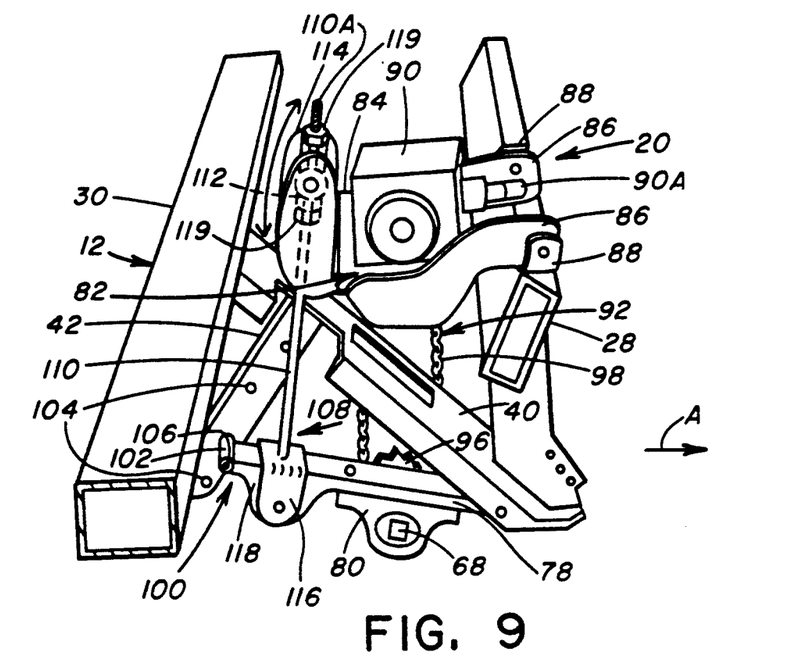
FIG. 9 is an enlarged fragmentary perspective of the drive mechanism and of an adjustable pivotal mounting means of the mulching assembly of the machine of FIG. 1.

Referring to FIGS. 7 and 9, the mounting means 66 includes a plurality of support arms 78 each having opposite forward and rear ends 78A, 78B. The support arms 78 extend along the direction A of movement of the machine 10 through the field between the vertical front and rear members 36, 38 of the respective frame sections 32. Each support arm 78 at its forward end 78A is pivotally connected to the lower end of the vertical front member 36. Each support arm 78 between its forward and rear ends 78A, 78B has a bearing block 80 mounted thereto below the support arm 78. The elongated bar 68 of the mulching member 26 extends through the transversely spaced and aligned bearing blocks 80 on the support arms 78 in such manner is rotatably mounted by the bearing blocks 80 in the aforementioned transverse relation to the direction A of travel of the machine 10 across the field.

Referring to FIGS. 2 and 9, the drive mechanism 20 of the machine 10 for operating the mulching member 26 of the mulching assembly 18 is drivingly connectable to the tractor and drivingly connected to the mulching member 26. The drive mechanism 20 includes a platform 82 having a flat base 84 and a pair of first flanges 86 connected along opposite sides of the base 84 and extending forwardly thereform. The platform 82 is pivotally mounted to the support frame 12 at a pair of pivotal connections of the forward ends of the first flanges 86 of the platform 82 to a pair of tabs 88 fixedly mounted upright on the front beam member 28 of the support frame 12.

The drive mechanism 20 also includes a gearbox 90 mounted on the base 84 of the platform 82 and having an input drive shaft 90A and an output drive shaft 90B (only seen in FIG. 2), and a rotational drive transmission train 92 extending between and drivingly coupling the output drive shaft 90B and the mulching member 26. The drive transmission train 92 includes a drive sprocket 94 (only seen in FIG. 2) on the output drive shaft 90B, a driven sprocket 96 on the mulching member 26, and an endless drive chain 98 entrained over and extending between the drive and driven sprockets 94, 96. A suitable telescopible drive shaft (not shown) can be utilized to drivingly couple the input drive shaft 90A of the gearbox 90 to the power takeoff (PTO) of the tractor.

The support arms 78 of the mounting means 66 are connected at or near their rear ends 78B so as to support the mulching member 26 either in a vertically floating position relative to the field in which the mulching member 26 rides on the top surface of the seed beds B or in a vertically adjustable set position relative to the field in which the mulching member 26 is forced down to a desired depth below the top surface T of the seed beds B. In order to permit the drive mechanism 20 to operate the mulching member 26 in any one of the different vertical set positions relative to the field, the mulching assembly 18 has first means 100 in the form of a hollow collar 102 provided on the rear end 78B of each support member 78 and a row of generally vertically spaced holes 104 defined through the second brace members 42 of the frame sections 32. The holes 104 define the different vertical set positions for the mulching member 26. A removable fastener 106 is employed to connect the rear end 78B of the support arms 78 to second brace members 42 of the frame sections 32.

In order to permit the drive mechanism 20 to maintain the drive and driven sprockets 94, 96 at a preset distance from one another to thereby maintain the proper tension in drive chain 98, and further to operate the mulching member 26 in a vertically floating position relative to the field when the fasteners 106 are removed from the rear end 78B of the support arms 78, the mulching assembly 18 has second means 108. The second means 108 takes the form of an elongated connecting rod 110 and a coupler 112 slidably mounted on an upper end portion 110A of the connecting rod 110 and pivotally connected between a pair of second flanges 114 fixed on the base 84 of the platform 82. The connecting rod 110 also has a yoke 116 at its lower end pivotally connected to a boss 118 located near the rear end 78B of the one support arm 78 positioned below the platform 82. By adjusting turning a pair of nuts 119 (FIG. 9) threaded on the threaded upper end portion 110A of the connecting rod 110 at opposite upper and lower ends of the coupler 112, the upper platform 82 can be pivoted relative to the lower support arm 78 and thereby the drive chain 98 can be adjusted to the desired tension.

Seed Bed Conditioning Roller Assemblies

Referring to FIGS. 1, 2 and 7, there is shown the plurality of seed bed conditioning roller assemblies 22 being operable to continue to level and smooth the bed B and to pack the top surfaces T of the seed beds B to the desired degree as the machine 10 is moved through the field. The conditioning roller assemblies 22 are mounted to the rear beam member 30 of the main support frame 12 and to pairs of the frame sections 32 of the support frame 12 and are aligned with the space between the pairs of frame sections 32. Also, the conditioning roller assemblies 22 are disposed in laterally spaced relation to one another so as to extend transversely to the direction A of movement of the machine 10 through the field.

Each seed bed conditioning roller assembly 22 includes a roller 120 and a pair of flotation mechanisms 122. The roller 120 is disposed between the pair of flotation mechanisms 122 and has a pair of stub shafts 124 fixed to and extending axially outwardly in opposite directions from opposite ends of the roller 120. The coaxial stub shafts 124 define a rotational axis of the roller 120 extending transversely to the direction A of movement of the machine 10 through the field. The pair of flotation mechanisms 122 are laterally spaced from one another.

Each flotation mechanism 122 includes an elongated mounting arm 126, an elongated support rod 128 and an elongated helical spring 130 inserted over the support rod 128. Each mounting arm 126 is rotatably mounted at its rear end to one of the opposite stub shafts 124 of the roller 120 and releasably and pivotally connected at its forward end by a removable pin (not shown) through a hole 140 on the vertical rear member 38. Each support rod 128 has a clevis 136 on its lower end by which the rod 128 is pivotally connected to a flange 126A on the mounting arm 126 and a slidable T-shaped connector 138 movably mounted on the rod 128 adjacent to its upper end and above the spring 130. A removable pin 132 connects the slidable connector 138 on the rod 128 to a releasable attachment structure 134 fixed on the rear side of the rear beam member 30 of the support frame 12. The spring 130 is captured between the clevis 136 and slidable connector 138 so as to apply downwardly-directed pressure on the roller 120 as an outer cylindrical surface 142 of the roller floatably and rotatably rides on the surface of the seed bed B in order to cause the roller 120 to smooth and pack the surface S of the seed bed B to the desired degree as the machine 10 is moved through the field.

Given the releasable connections of the flotation mechanisms 122 with the main support frame 12, the conditioning roller assemblies 22 can easily and quickly to removed and remounted on the machine 10 to accommodate the particular condition desired for the surface S of the seed bed B. Also, rollers 120 having different types outer cylindrical surface structures designed for use in different moisture and soil conditions can be easily and quickly interchanged on the machine 10. As seen in FIG. 1, the rollers 120 have wire mesh or expanded metal constructions. The conditioning rollers 120 also function to gauge the depth of the entire machine 10.

Furrow Side Finishing Slide Assemblies

Referring to FIGS. 1, 7, 10 and 11, there is shown the plurality of furrow side finishing slide assemblies 24 of the machine 10 being operable to smooth and pack surfaces of sides S of the furrows F formed by the shovel assemblies 16 as the machine 10 is moved through the field. The furrow side finishing slide assemblies 24 are mounted to the main support frame 12 in laterally spaced relation to one another transversely to the direction of movement of the machine 10 through the field. The slide assemblies 24 extend along the direction of movement of the machine 10 rearwardly from and aligned with the respective shovel assemblies 16 and between the adjacent seed bed conditioning roller assemblies 22.

Figure 10:
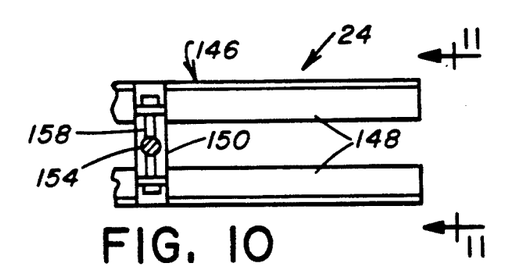
FIG. 10 is a fragmentary top plan view of one of the furrow side finishing slide assemblies as seen along line 10—10 of FIG. 7.
Figure 11:
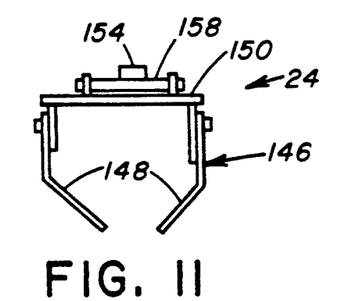
FIG. 11 is a rear view of slide assembly as seen along line 11—11 of FIG. 10.

Each slide assembly 22 includes a flotation mechanism 144 and an elongated compactor structure 146. The compactor structure 146 includes a pair of opposing and laterally spaced apart longitudinal flat side members 148 converging forwardly toward one another and a brace 150 extending between and rigidly interconnected top edges of the longitudinal side members 148. As an example, the longitudinal side members 148 can be constructed of any suitable material, such as ultra-high molecular weight polyethylene, to give better abrasion resistance. The side members 148 provide shields to keep the soil from being pushed back into the furrow F by the operation of the mulching member 26 and the conditioning rollers 120.

The compactor structure 146 at a forward end is pivotally mounted by a removable pin 152 to the vertical front member 36 of the frame structure 32 of the main support frame 12. A region of each slide member 148 is cutout at 148A to allow passage of the mulching bar 68. At the brace 150 of the compactor structure 146 located between opposite forward and rear ends thereof and adjacent to the conditioning roller assemblies 22, the compactor structure 146 is pivotally connected to the flotation mechanism 144.

The flotation mechanism 144 includes an elongated support rod 154 and an elongated helical spring 156 inserted over the support rod 154. The support rod 154 has a T-shaped connector 158 fixed on its lower end by which the rod 154 is pivotally connected to the brace 150 on the compactor structure 146 and has a slidable T-shaped connector 160 movably mounted on the support rod 154 adjacent its upper end and above the spring 156 by which the rod 154 is connected to the releasable attachment structure 134 fixed on the rear side of the rear beam member 30 of the support frame 12. As seen in FIG. 7, the attachment structure 134 defines a plurality of compartments 134A in side-by-side relationship to one another for receiving the slidably connectors 138 on rods 128 of adjacent rollers 120 and the slidable connector 160 on the rod 154 of the flotation mechanism 144 in side-by-side relationship in the plurality of compartments 134A with the pin 132 extending therethrough and pivotally connecting the the connectors 138, 160 to the attachment structure 134. The spring 156 is captured between the lower fixed connector 158 and upper slidable connector 160 so as to apply downwardly-directed pressure on the compactor structure 146 in order to smooth and pack the sides S of the furrow F the desired degree as the machine 10 is moved through the field.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An irrigation furrow and raised seed bed forming machine, comprising:
  (a) a main support frame including a pair of fore-and-aft spaced front and rear beam members extending transversely to the direction of movement of said machine through the field;
  (b) means for mounting said main support frame to a tractor to extend transversely to the direction of movement of said machine by the tractor through a field, said mounting means including a hitch assembly being relocatable between a first orientation relative to the tractor on one of said front and rear beam members of said main support frame for connecting said machine to the tractor in a first mode so that said machine can be moved through the field in a fixed vertical position relative to the field by the tractor and a second orientation relative to the tractor on the other of said front and rear beam members of said main support frame for connecting said machine to the tractor in a second mode so that said machine can be moved through the field in a vertically adjustable position relative to the field by the tractor;
  (c) means for detachably connecting said hitch assembly on a selected one of said front and rear beams at a time for relocating said hitch assembly to and mounting said hitch assembly to a corresponding one of said first and second orientations; and
  (d) means mounted to said main support frame for forming soil of a field into a plurality of generally parallel laterally spaced irrigation furrows and raised and mulched seed beds located between the furrows as said machine is moved through the field.

2. The machine of claim 1 where said hitch assembly includes a pair of brackets being mountable upon said front transverse beam member in a first side-by-side spaced apart relation with respect to one another when relocated to said first orientation and being mountable upon said rear transverse beam member in a second side-by-side flush relation with respect to one another when relocated to said second orientation.

3. An irrigation furrow and raised seed bed forming machine, comprising:
   (a) a main support frame;
   (b) means for mounting said main support frame to a tractor to extend transversely to the direction of movement of said machine by the tractor through a field;
   (c) a plurality of furrow and seed bed forming shovel assemblies mounted to a forward portion of said main support frame in spaced relation to one another transversely to the direction of movement of said machine through the field, said shovel assemblies being operable to form soil of the field into a plurality of generally parallel laterally spaced irrigation furrows and raised seed beds located between the furrows as said machine is moved through the field; and
   (d) a seed bed mulching assembly mounted to said main support frame rearwardly of said furrow and seed bed forming shovel assemblies, aid mulching assembly having an elongated rotatable mulching member extending transversely to the direction of movement of said machine through the field and being operable to mulch soil so as to form seed beds between the furrows as said machine is moved through the field, said seed bed mulching assembly including
      (i) a plurality of support arms each having opposite forward and rear ends and being disposed between said forward portion and a rearward portion of said main support frame and along the direction of movement of said machine through the field, each of said support arms being pivotally connected at said forward end to said forward portion of said main support frame,
      (ii) means for connecting said rear end of each of said support arms to said main support frame, and
      (iii) means rotatably mounting said elongated mulching member to each of said support arms between said forward and rear ends thereof and in said transverse relation to the direction of movement of said machine through the field.

4. The machine of claim 3 wherein each of said furrow and seed bed forming shovel assemblies includes:
   a soil turning shovel;
   a bracket mounting said shovel; and
   means for removably attaching said bracket to said forward portion of said main support frame at a selected one of a plurality of vertically spaced locations thereon to adjustably preset said shovel relative to said main support frame at any one of a plurality of different desired depths in the ground to form an irrigation furrow having a corresponding depth as said machine is moved through the field.

5. The machine of claim 4 further comprising:
   a plurality of seed bed conditioning roller assemblies mounted to a rearward portion of said main support frame rearwardly of said mulching member and in spaced relation to one another transversely to the direction of movement of said machine through the field, each of said conditioning roller assemblies being operable to smooth and pack the surface of the seed bed to a desired degree as said machine is moved through the field.

6. The machine of claim 5 wherein each of said conditioning roller assemblies includes:
   a pair of flotation mechanisms pivotally mounted to and extending from said rearward portion of said main support frame and being laterally spaced from one another; and
   a roller disposed between said flotation mechanisms and having a rotational axis extending transversely to the direction of movement of said machine through the field, said roller also having a pair of opposite ends rotatably mounted to said flotation mechanism and an outer cylindrical surface for floatably and rotatably riding on the seed bed, said flotation mechanisms being capable of applying downwardly-directed pressure on said roller to smooth and pack the surface of the seed bed to the desired degree as said machine is moved through the field.

7. The machine of claim 4 further comprising:
   a plurality of furrow side finishing slide assemblies mounted to said main support frame in spaced relation to one another transversely to the direction of movement of said machine through the field, said slide assemblies extending along the direction of movement of said machine rearwardly from and aligned with said respective furrow and seed bed forming shovel assemblies, between said seed bed conditioning roller assemblies, and intersecting with said seed bed mulching member, said slide assemblies being operable to smooth and pack surfaces of sides of the furrows formed by said shovel assemblies as said machine is moved through the field.

8. An irrigation furrow and raised seed bed forming machine, comprising:
   (a) a main support frame;
   (b) means for mounting said main support frame to a tractor to extend transversely to the direction of movement of said machine by the tractor through a field;
   (c) a plurality of furrow and seed bed forming shovel assemblies mounted to a forward portion of said main support frame in spaced relation to one another transversely to the direction of movement of said machine through the field, said shovel assemblies being operable to form soil to the field into a plurality of generally parallel laterally spaced irrigation furrows and raised seed beds located between the furrows as said machine is moved through the field;
   (d) a seed bed mulching assembly mounted to said main support frame rearwardly of said furrow and seed bed forming shovel assemblies, said mulching assembly having an elongated rotatable mulching member extending transversely to the direction of movement of said machine through the field and being operable to mulch soil so as to form seed beds between the furrows as said machine is moved through the field;

(e) a plurality of seed bed conditioning roller assemblies mounted to a rearward portion of said main support frame rearwardly of said mulching member and in spaced relation to one another transversely to the direction of movement of said machine through the field, each of said conditioning roller assemblies being operable to smooth and pack the surface of the seed bed to a desired degree as said machine is moved through the field; and (f) a plurality of furrow side finishing slide assemblies mounted to said main support frame in spaced relation to one another transversely to the direction of movement of said machine through the field, said slide assemblies extending along the direction of movement of said machine rearwardly from and aligned with said respective furrow and seed bed forming shovel assemblies, between said seed bed conditioning roller assemblies, and intersecting with said seed bed mulching member, said slide assemblies being operable to smooth and pack surfaces of sides of the furrows formed by said shovel assemblies as said machine is moved through the field, each of said slide assemblies including (i) a flotation mechanism pivotally mounted to and extending from said rearward portion of said main support frame, and (ii) an elongated compactor structure having opposite longitudinal side members converging forwardly toward one another and a pair of opposite forward and rear ends, said compactor structure at said forward end being rotatably mounted to said forward portion of said main support frame, said compactor structure between said forward and rear ends thereof and adjacent to said conditioning roller assemblies being pivotally mounted to said flotation mechanism, said flotation mechanism being capable of applying a downwardly directed pressure on said compactor structure to smooth and pack the surfaces of the sides of the furrows as said machine is moved through the field.

9. An irrigation furrow and raised seed bed forming machine, comprising:

(a) a main support frame;

(b) mans for mounting said main support frame to a tractor to extend transversely to the direction of movement of said machine by the tractor through a field;

(c) a plurality of furrow and seed bed forming shovel assemblies mounted to a forward portion of said main support frame in spaced relation to one another transversely to the direction of movement of said machine through the field, said shovel assemblies being operable to form soil of the field into a plurality of generally parallel laterally spaced irrigation furrows and raised seed beds located between the furrows as said machine is moved through the field;

(d) a seed bed mulching assembly mounted at a middle portion of said main support frame rearwardly of said furrow and seed bed forming shovel assemblies and having an elongated rotatable mulching member extending transversely to the direction of movement of said machine through the field and being operable to mulch soil so as to form seed beds between the furrows as said machine is moved through the field, said seed bed mulching assembly including (i) a plurality of support arms each having opposite forward and rear ends and being disposed between said forward and rearward portions and adjacent to said middle portion of said main support frame and along the direction of movement of said machine through the field, each of said support arms being pivotally connected at said forward end to said forward portion of said main support frame, (ii) means for connecting said rear end of each of said support arms to said main support frame, and (iii) means rotatably mounting said elongated mulching member to each of said support arms between said forward and rear ends thereof and in said transverse relation to the direction of movement of said machine through the field;

(e) drive means mounted to said main support frame and drivingly connected to said mulching member, said drive means being operable for causing rotation of said mulching member so as to mulch soil and thereby form seed beds between the furrows as said machine is moved through the field; and (f) a plurality of seed bed conditioning roller assemblies rotatably mounted to a rearward portion of said main support frame rearwardly of said mulching member and in spaced relation to one another transversely to the direction of movement of said machine, each of said conditioning roller assemblies being operable to smooth and pack the surface of the seed bed to a desired degree as said machine is moved through the field.

10. The machine of claim 9 wherein each of said furrow and seed bed forming shovel assemblies includes:

a soil turning shovel;

a bracket mounting said shovel; and means for removably attaching said bracket to said forward portion of said main support frame at a selected one of a plurality of vertically spaced locations thereon to adjustably preset said shovel relative to said main support frame at any one of a plurality of different desired depths in the ground to form an irrigation furrow having a corresponding depth as said machine is moved through the field.

11. The machine of claim 9 wherein said drive means includes:

a platform mounted to said main support frame in spaced relation above said mulching member; and a rotational drive transmission mechanism supported on said platform and being drivingly connectable to the tractor and drivingly connected to said mulching member.

12. The machine of claim 11 wherein said mulching assembly also includes:

first means for interconnecting said rear end of each of said support arms to said rearward portion of said main support frame to permit said drive means to operate said mulching member in any one of a plurality of different vertical set positions relative to the field; and second means for interconnecting said rear end of one of said support arms to said platform to permit said mulching member to operate in a vertically floating position relative to the field.

13. The machine of claim 9 wherein said mulching member includes:

an elongated bar; and a plurality of teeth-bearing elements attached on said bar forwardly of and extending generally parallel to said conditioning roller assemblies, said teeth-bearing elements being operable upon rotation of said bar to mulch soil and crush soil clods such that soil of the seed beds formed between the furrows is tilled and levelled to a desired extent as said machine is moved through the field.

14. The machine of claim 9 wherein each of said seed bed conditioning roller assembly includes:

a pair of flotation mechanisms pivotally mounted to and extending rearwardly from said rearward portion of said main support frame and being laterally spaced from one another; and a roller disposed between said flotation mechanisms and having a rotational axis extending transversely to the direction of movement of said machine through the field, said roller also having a pair of opposite ends rotatably mounted to said flotation mechanisms and an outer cylindrical surface for floatably and rotatably riding on the seed bed, said flotation mechanisms being capable of applying downwardly-directed pressure on said roller to smooth and pack the surface of the seed bed to the desired degree as said machine is moved through the field.

15. An irrigation furrow and raised seed bed forming machine, comprising:

(a) a main support frame;

(b) means for mounting said main support frame to a tractor to extend transversely to the direction of movement of said machine by the tractor through a field;

(c) a plurality of furrow and seed bed forming shovel assemblies mounted to a forward portion of said main support frame in spaced relation to one another transversely to the direction of movement of said machine through the field, said shovel assemblies being operable to from soil of the field into a plurality of generally parallel laterally spaced irrigation furrows and raised seed beds located between the furrows as said machine is moved through the field;

(d) a seed bed mulching assembly mounted at a middle portion of said main support frame rearwardly of said furrow and seed bed forming shovel assemblies and having an elongated rotatable mulching member extending transversely to the direction of movement of said machine through the field and being operable to mulch soil so as to form seed beds between the furrows as said machine is moved through the field, said seed bed mulching assembly including (i) a plurality of support arms each having opposite forward and rear ends and being disposed between said forward and rearward portions and adjacent to said middle portion of said main support frame and along the direction of movement of said machine through the field, each of said support arms being pivotally connected at said forward end to said forward portion of said main support frame, (ii) means for connecting said rear end of each of said support arms to said main support frame, and (iii) means rotatably mounting said elongated mulching member to each of said support arms between said forward and rear ends thereof and in said transverse relation to the direction of movement of said machine through the field;

(e) drive means mounted to said main support frame and drivingly connected to said mulching member, said drive means being operable for causing rotation of said mulching member so as to mulch soil and thereby form seed beds between the furrows as said machine is moved through the field; and (f) a plurality of furrow side finishing slide assemblies mounted to said main support frame in spaced relation to one another transversely to the direction of movement of said machine through the field, said slide assemblies extending along the direction of movement of said machine rearwardly from and aligned with said respective furrow and seed bed forming shovel assemblies between and intersecting with opposite ends of each of said seed bed mulching members, said slide assemblies being operable to smooth and pack surfaces of sides of the furrows formed by said shovel assemblies as said machine is moved through the field.

16. The machine of claim 15 wherein each of said furrow and seed bed forming shovel assemblies includes:

a soil turning shovel;

a bracket mounting said shovel; and means for removably attaching said bracket to said forward portion of said main support frame at a selected one of a plurality of vertically spaced locations thereon to adjustably preset said shovel relative to said main support frame at any one of a plurality of different desired depths in the ground to form an irrigation furrow having a corresponding depth as said machine is moved through the field.

17. The machine of claim 15 wherein said drive means includes:

a platform mounted to said main support frame in spaced relation above said mulching member; and a rotational drive transmission mechanism supported on said platform and being drivingly connectable to the tractor and drivingly connected to said mulching member.

18. The machine of claim 17 wherein said mulching assembly also includes;

first means for interconnecting said rear end of each of said support arms to said rearward portion of said main support frame to permit said drive means to operate said mulching member in any one of a plurality of different vertical set positions relative to the field; and second means for interconnecting said rear end of one of said support arms to said platform to permit said mulching member to operate in a vertically floating position relative to the field.

19. The machine of claim 15 wherein said mulching member includes:

an elongated bar; and a plurality of teeth-bearing elements attached on said bar forwardly of and extending generally parallel to said conditioning roller assemblies, said teeth-bearing elements being operable upon rotation of said bar to mulch soil and crush soil clods such that soil of the seed beds formed between the furrows is tilled and levelled to a desired extent as said machine is moved through the field.

20. An irrigation furrow and raised seed bed forming machine, comprising:
(a) a main support frame;
(b) means for mounting said main support frame to a tractor to extend transversely to the direction of movement of said machine by the tractor through a field;
(c) a plurality of furrow and seed bed forming shovel assemblies mounted to a forward portion of said main support frame in spaced relation to one another transversely to the direction of movement of said machine through the field, said shovel assemblies being operable to form soil of the field into a plurality of generally parallel laterally spaced irrigation furrows and raised seed beds located between the furrows as said machine is moved through the field;
(D) a seed bed mulching assembly mounted at a middle portion of said main support frame rearwardly of said furrow and seed bed forming shovel assemblies and having an elongated rotatable mulching member extending transversely to the direction of movement of said machine through the field and being operable to mulch soil so as to form seed beds between the furrows as said machine is moved through the field;
(e) drive means mounted to said main support frame and drivingly connected to said mulching member, said drive means being operable for causing rotation of said mulching member so as to mulch soil and thereby form seed beds between the furrows as said machine is moved through the field; and
(f) a plurality of furrow side finishing slide assemblies mounted to said main support frame in spaced relation to one another transversely to the direction of movement of said machine through the field, said slide assemblies extending along the direction of movement of said machine rearwardly from and aligned with said respective furrow and seed bed forming shovel assemblies between and intersecting with opposite ends of each of said seed bed mulching members, said slide assemblies being operable to smooth and pack surfaces of sides of the furrows formed by said shovel assemblies as said machine is moved through the field, each of said furrow side finishing slide assemblies including
 (i) a flotation mechanism pivotally mounted to and extending from said rearward portion of said main support frame, and
 (ii) an elongated compactor structure having opposite longitudinal side members converging forwardly toward one another and a pair of opposite forward and rear ends, said compactor structure at said forward end being rotatably mounted to said forward portion of said main support frame, said compactor structure between said forward and rear ends thereof and adjacent to said conditioning roller assemblies being pivotally mounted to said flotation mechanism, said flotation mechanism being capable of applying a downwardly directed pressure on said compactor structure to smooth and pack the surfaces of the sides of the furrows as said machine is moved through the field.

21. An irrigation furrow and raised seed bed forming machine, comprising:
(a) a main support frame;
(b) means for mounting said main support frame to a tractor to extend transversely to the direction of movement of said machine by the tractor through a field;
(c) a plurality of frame sections mounted to said main support frame in spaced relation to one another transversely to the direction of movement of said machine through the field, each of said frame sections extending along the direction of movement of said machine through the field;
(d) a plurality of furrow and seed bed forming shovel assemblies mounted to respective leading ends of said frame sections in laterally spaced relation to one another, said shovel assemblies being operable to form soil of the field into a plurality of generally parallel laterally spaced irrigation furrows and raised seed beds located between the furrows as said machine is moved through the field;
(e) a seed bed mulching assembly mounted to said frame sections rearwardly of said furrow and seed bed forming shovel assemblies, said mulching assembly having an elongated rotatable mulching member extending transversely to the direction of movement of said machine and being operable to mulch soil so as to form seed beds between the furrows as said machine is moved through the field;
(f) a plurality of seed bed conditioning roller assemblies mounted between trailing ends of said frame sections in laterally spaced relation to one another and rearwardly of said mulching member, each of said conditioning roller assemblies being operable to smooth and pack the surface of the seed bed to a desired degree as said machine is moved through the field; and
(g) a plurality of furrow side finishing slides mounted to said frame sections in laterally spaced relation to one another, said slide assemblies extending along the direction of movement of said machine rearwardly from and aligned with said furrow and seed bed forming shovel assemblies, between said seed bed conditioning roller assemblies, and intersecting with said seed bed mulching member, said slide assemblies being operable to smooth and pack surfaces of sides of the furrows formed by said shovel assemblies as said machine is moved through the field, each of said furrow side finishing slide assemblies including
 (i) a flotation mechanism pivotally mounted to and extending from said main support frame and being laterally spaced from one another, and
 (ii) an elongated compactor structure having opposite longitudinal side members converging forwardly toward one another and a pair of opposite forward and rear ends, said compactor structure at said forward end being rotatably mounted to said leading end of one of said frame sections, said compactor structure between said forward and rear ends thereof and adjacent to said conditioning roller assemblies being pivotally mounted to said flotation mechanism, said flotation mechanism being capable of applying a downwardly directed pressure on said compactor structure to smooth and pack the surfaces of the sides of the furrows as said machine is moved through the field.

22. The machine of claim 21 wherein each of said furrow and seed bed forming shovel assemblies includes:

a soil turning shovel; and means for removably mounting said shovel to said leading end of one of said frame sections so as to be vertically adjustable relative to said main support frame for presetting said shovel at any one of a plurality of different desired depths in the ground to form an irrigation furrow having a corresponding depth as said machine is moved through the field.

23. The machine of claim 21 wherein said seed bed mulching assembly also includes means for mounting said mulching member for operation either in a vertically floating position relative to the field or in any one of a plurality of different vertical set positions relative to the field.

24. The machine of claim 21 wherein each of said seed bed conditioning roller assemblies includes:

a pair of flotation mechanisms pivotally mounted to and extending rearwardly from said trailing end of one of said frame sections and being laterally space from one another; and a roller disposed between said flotation mechanisms and having a rotational axis extending transversely to the direction of movement of said machine through the field, said roller also having a pair of opposite ends rotatably mounted to said flotation mechanisms and an outer cylindrical surface for floatably and rotatably riding on the seed bed, said flotation mechanisms being capable of applying downwardly-directed pressure on said roller to smooth and pack the surface of the seed bed to a desired degree as said machine is moved through the field.

* * * * *